Dec. 21, 1948.  R. E. RAMBO ET AL  2,456,993
RADIAL COMMUTATOR ASSEMBLY
Filed Oct. 24, 1945

WITNESSES:
Leroy M. Garman

INVENTORS
Rawdon E. Rambo and
Charles F. Jenkins.
BY
O. B. Buchanan
ATTORNEY

Patented Dec. 21, 1948

2,456,993

UNITED STATES PATENT OFFICE 2,456,993

RADIAL COMMUTATOR ASSEMBLY

Rawdon E. Rambo, Pittsburgh, and Charles F. Jenkins, Laughlintown, Pa., assignors to Westinghouse Electric Corporation, East Pittsburgh, Pa., a corporation of Pennsylvania Application October 24, 1945, Serial No. 624,287

3 Claims. (Cl. 172—321)

1

The present invention relates to radial-commutator assemblies for small direct-current motors or other commutator-type dynamo-electric machines.

The principal object of our invention is to provide a novel radial-commutator construction in which the angle-section commutator-bars, with segment shaped front flanges, are utilized to provide the connections between a plurality of radially superimposed layers of the coil-ends of the armature-winding, with suitable segmental insulating spacers between the radial commutator-bars.

A further object of our invention is to provide a novel radial-commutator assembly including the combination, with the radial commutator, of a plurality of radially disposed brushholders which are insulatingly supported on a single brushholder-supporting ring which is disposed approximately in the space between the shaft and the inner periphery of the radial commutator. This construction is possible, because of the fact that the radial commutator is supported directly on the ends of the armature-coils, so that there is this space available, for the brushholder-supporting ring, as just mentioned.

With the foregoing and other objects in view, our invention consists in the combinations, structures, methods, parts and assemblies, hereinafter described and claimed, and illustrated in the accompanying drawing, wherein:

Figure 1:
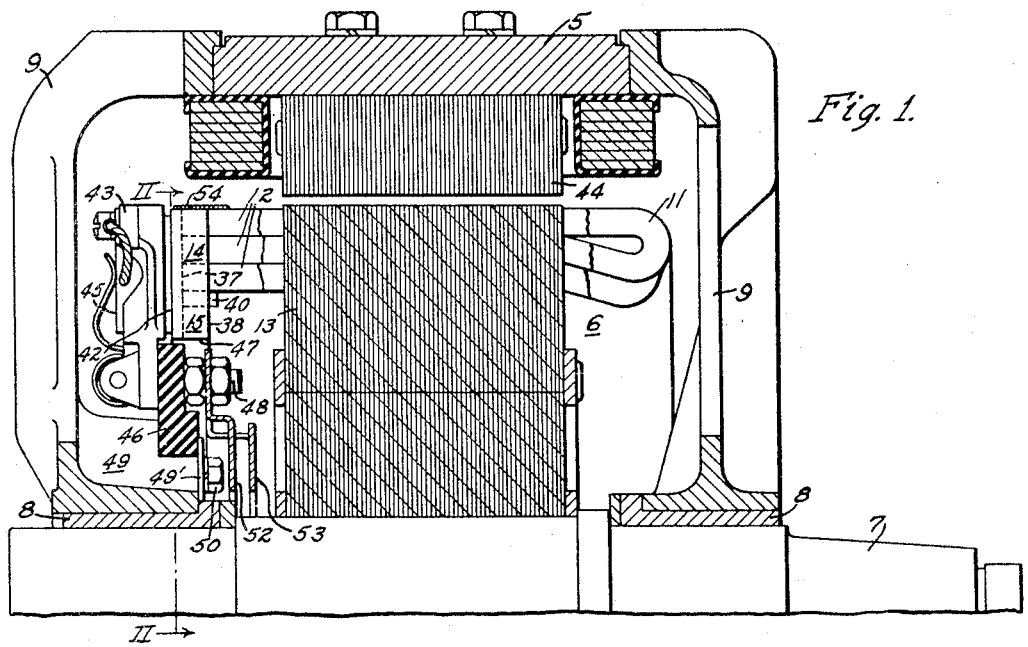
Figure 1 is a longitudinal sectional view of the top half of a small direct-current motor embodying our invention in an illustrative form of embodiment.
Figure 2:
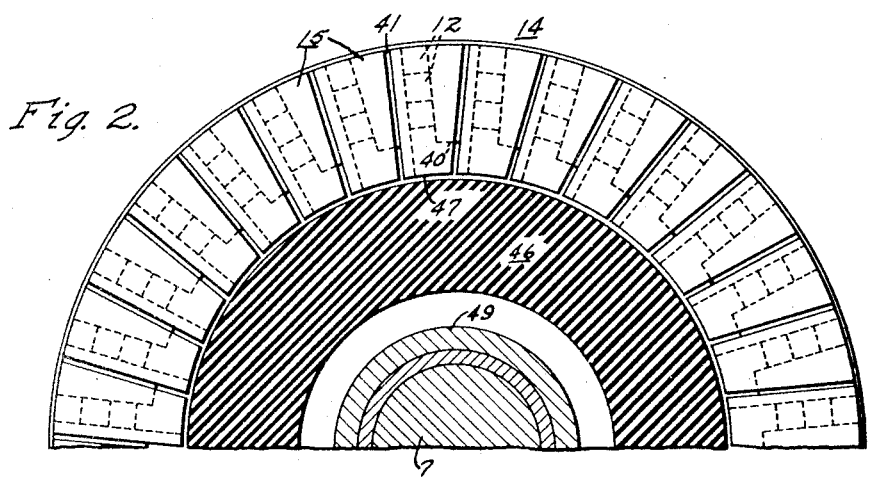
Fig. 2 is a transverse cross-sectional view on the plane II—II in Fig. 1, showing the radial front face of the commutator in elevation.
Figure 3:
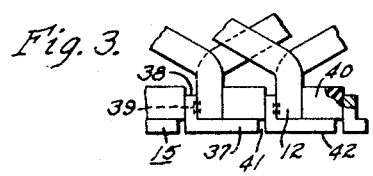
Fig. 3 is a fragmentary peripheral plan-view of the radial commutator.

In Fig. 1, we show our invention as being embodied in a small direct-current motor having a field member 5 and an armature member 6, the latter being mounted on a shaft 7 which is supported in bearings 8 carried by end brackets 9 on the stator-frame. The armature or rotor member 6 has an armature winding 11 having a plurality of coil-ends 12 extending from the armature-core 13 at one end of the machine, the coil-ends 12 being disposed in such a manner as to constitute a radially disposed ring of coil-ends, spaced from the shaft. These coil-ends 12 are disposed in a plurality of layers, one radially above another. At the ends of these coil-ends 12, we provide a radial-commutator assembly 14, composed of a plurality of radially disposed segment-faced commutator-bars 15 which are secured to the several coil-ends, each bar being secured to a plurality of radially superposed coil-ends.

In accordance with our invention, we provide a novel form of commutator-construction, in which each of the commutator-bars 15 consists of a copper piece of angular section, having a segment-shaped front flange 37, and a rearwardly directed lateral flange 38. The coil-ends 12 are soldered or brazed or welded laterally against the rearwardly directed flange 38, as indicated at 39. Preferably, each bar is separately welded to its connected coil-ends, before the commutator is completed any further; the wide spaces between the lateral flange 38 and the next spaced coil-ends making it convenient to utilize a welding-tool (not shown) for squeezing the welded parts together.

When each commutator-bar has been united to its respective coil-ends, the bars are tightly held together, with lateral spaces between them, by a plurality of segment-shaped spacer-bars 40, of insulating material, which are disposed back of the front flanges 37 of the commutator-bars 12. Each insulating spacer-bar 40 is disposed radially, between the rearwardly directed flange 38 of one of the commutator-bars 15 and the coil-ends 12 which are connected to the next commutator-bar.

It will be noted that the spacer-bars 40 are considerably thicker than the lateral spaces 41 between the segmental front flanges 38 of successive commutator-bars 15, so that the spacer-bars 40 have sufficient rigidity or stiffness to permit them to be pounded radially into place. It will further be noted that the spacer-bars 40 are segment-shaped, which would not be true of insulating strips placed between consecutive commutator-bars, in the spaces 41, as in the usual construction. By reason of the segmental shape of the spacer-bars, they act as wedges, which tighten up the commutator and hold the assembly under arch-binding, when the insulating spacer-bars are pounded radially inwardly, into place.

Bearing against the radial front-surface 42 of the commutator, are a plurality of radially disposed brushholders 43 of a plurality of different polarities, there being a plurality of brushholders of each polarity. In a direct-current machine, as illustrated, there are only two polarities, namely the positive brushes and the negative brushes, and the number of brushholders is commonly the same as the number of poles 44 of the machine. Each brushholder 43 carries a brush 45 which bears against the radial commutator-surface 42.

The brushholders 43 are insulatingly supported by a single supporting-ring 46, which is disposed approximately in the annular space between the shaft 7 and the inner periphery 47 of the radial commutator 14, in spaced relation to the commutator. In the illustrated form of embodiment of our invention, the brushholder-supporting ring 46 is made of insulating material, and is bolted directly to the several brushholders 43, by bolts 48. The brushholder-supporting ring 46 is held on the hub 49 of the front-end bracket 9, by means of a washer 49' and bolts 50.

Since the commutator end-connections 12 necessarily extend out a certain distance from the commutator-core 13, there is thus an annular space between the brushholder-supporting ring 46 and the end of the rotor-member, and in this space, we dispose brushholder cross-connections, which are in the form of two specially designed rings 52 and 53, as more particularly claimed in our copending application on Brushholder cross-connections, Serial No. 624,286, filed October 24, 1945, now Patent 2,431,255 issued November 18, 1947.

The entire commutator-assembly, including the commutator-bars 15, the insulating spacers 18, and the coil-ends 12, are held together, and strengthened, by suitable insulating banding means 54, as shown in Fig. 1.

We claim as our invention:

1. A dynamo-electric machine having a commutator-type rotor-member, a shaft for the rotor-member, a radial commutator disposed at one end of the rotor-member in spaced relation to the shaft, a single brushholder-supporting ring disposed approximately in the space between the shaft and the inner periphery of the radial commutator, in spaced relation to the latter, and a plurality of radially disposed brushholders supported on said brushholder-supporting ring in position to carry brushes bearing on said commutator.

2. The invention as defined in claim 1, characterized by the commutator-bars being of angular section, each commutator-bar having a segment-shaped front flange and a rearwardly directed lateral flange, the several coil-ends being laterally connected to the several rearwardly directed flanges of the commutator-bars, and each insulating separator being of segmental shape and being disposed between the rearwardly directed flange of one of the commutator-bars and the coil-ends which are connected to the next commutator-bar.

3. A dynamo-electric machine having a commutator-type rotor-member, a shaft for the rotor-member, said rotor member having coil-ends extending therefrom, at one end, in such manner as to constitute a radially disposed ring of coil-ends spaced from the shaft, said coil-ends being disposed in a plurality of layers, one radially above another, a radial-commutator assembly comprising a plurality of radially disposed commutator-bars secured to the several coil-ends, each bar being secured to a plurality of radially superposed coil-ends, each commutator-bar being of angular section, including a segment-shaped front flange and a rearwardly directed lateral flange, the several coil-ends being laterally connected to the several rearwardly directed flanges of the commutator-bars, and insulating separators for maintaining a spacing between successive commutator-bars, each separator being of segmental shape and being disposed between the rearwardly directed flange of one of the commutator-bars and the coil-ends which are connected to the next commutator-bar.

RAWDON E. RAMBO.
CHARLES F. JENKINS.

REFERENCES CITED

The following references are of record in the file of this patent:

UNITED STATES PATENTS

| Number | Name | Date |
| --- | --- | --- |
| 485,669 | Thomson | Nov. 8, 1892 |